(12) United States Patent
Gagné

(10) Patent No.: US 6,752,447 B2
(45) Date of Patent: Jun. 22, 2004

(54) WINDSHIELD ASSEMBLY FOR AN ALL TERRAIN VEHICLE

(75) Inventor: Maurice Gagné, Sherbrooke (CA)

(73) Assignee: Bombardier Recreational Products Inc., St-Bruno (CA)

( * ) Notice: Subject to any disclaimer, the term of this patent is extended or adjusted under 35 U.S.C. 154(b) by 0 days.

(21) Appl. No.: 10/021,572

(22) Filed: Dec. 19, 2001

(65) Prior Publication Data

US 2002/0074820 A1 Jun. 20, 2002

Related U.S. Application Data

(60) Provisional application No. 60/256,309, filed on Dec. 19, 2000.

(51) Int. Cl.$^7$ .................................................. B60J 1/20
(52) U.S. Cl. ........................................ 296/92; 296/78.1
(58) Field of Search ................ 296/92, 77.1, 78.1, 296/84.1, 90, 91, 96.2, 96.21

(56) References Cited

U.S. PATENT DOCUMENTS

| | | | | |
|---|---|---|---|---|
| 3,622,196 A | | 11/1971 | Sarra ........................... 296/90 |
| 3,819,226 A | * | 6/1974 | Sykora ......................... 296/90 |
| 4,141,567 A | * | 2/1979 | Scott ........................... 296/78.1 |
| 4,353,590 A | * | 10/1982 | Wei-Chuan .................. 296/78.1 |
| 4,379,584 A | * | 4/1983 | Willey ......................... 296/78.1 |
| 4,479,663 A | * | 10/1984 | Morris et al. ............... 296/78.1 |
| 4,696,509 A | * | 9/1987 | Yagasaki et al. ........... 296/78.1 |
| 5,195,797 A | * | 3/1993 | Hobbs ......................... 296/77.1 |
| 5,791,720 A | * | 8/1998 | Moore et al. ............... 296/96.2 |
| 5,816,757 A | * | 10/1998 | Huston ........................... 410/3 |
| 5,857,727 A | * | 1/1999 | Vetter .......................... 296/78.1 |
| 5,961,175 A | * | 10/1999 | Clardy, Jr. .................. 296/77.1 |
| 6,402,228 B1 | * | 6/2002 | Chaffin ....................... 296/180.4 |

FOREIGN PATENT DOCUMENTS

| FR | 2612867 A1 | * | 9/1987 | ................ 296/78.1 |
|---|---|---|---|---|
| JP | 61-12422 | * | 1/1986 | ................ 296/96.2 |

* cited by examiner

*Primary Examiner*—Lori L. Coletta
(74) *Attorney, Agent, or Firm*—Jonathan D. Cutler; BRP Legal Services

(57) ABSTRACT

A windshield assembly includes a windshield panel movable between an operative position and an inoperative position, and a coupling assembly coupled to the windshield panel, the coupling assembly including at least one coupling member that enables the windshield panel to move, e.g., between the operative position and the inoperative position. The coupling assembly may include a first end defining a mounting bracket and a second end defining a pivot point about which the windshield panel pivots. An inoperative position may be when the windshield panel is moved forwardly or rearwardly, e.g., approximately 90°. The windshield panel may be configured out of polycarbonate plastic. The windshield assembly may further include a handguard element connected to the windshield panel.

35 Claims, 7 Drawing Sheets

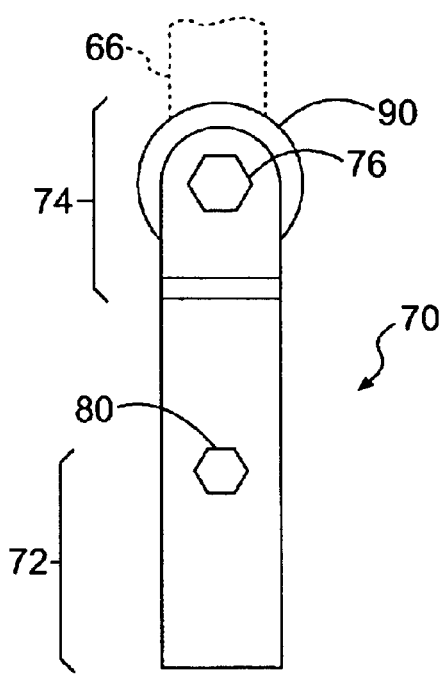
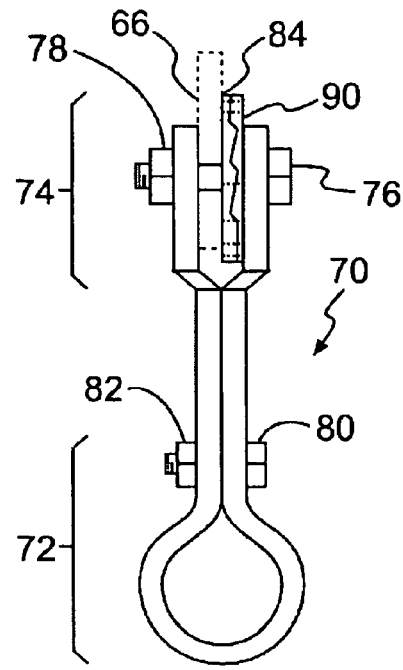
FIG. 7A  FIG. 7B
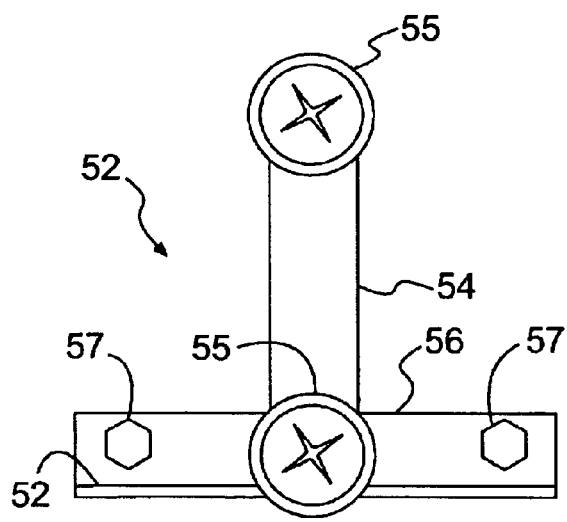
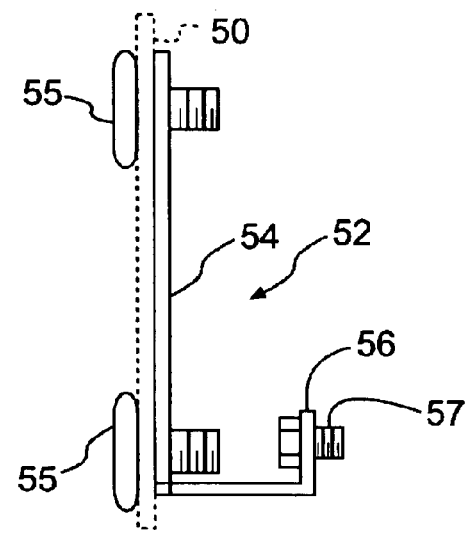
FIG. 8A  FIG. 8B

WINDSHIELD ASSEMBLY FOR AN ALL TERRAIN VEHICLE

CROSS-REFERENCE TO RELATED APPLICATION

This application claims priority from and the benefit of U.S. Provisional Application Serial No. 60/256,309, filed Dec. 19, 2000, the disclosure of which, including the specification, drawings and abstract, is incorporated herein by reference in its entirety.

BACKGROUND OF THE INVENTION

I. Field of the Invention

The present invention relates generally to windshield configurations for motorized land vehicles, and more specifically to a windshield assembly that is installable upon and removable from an all terrain vehicle. The device is of particular value when transporting the vehicle.

II. Description of Related Art

Relatively small vehicles of the type commonly referred to as all terrain vehicles (ATVs) have become very popular for both recreational and utility purposes. In general, they are gasoline-powered vehicles having three or four wheels designed for carrying an adult driver across rough and uneven terrain while the driver rides on a seat that is typically open and exposed (rather than in a closed or closable passenger compartment). Most ATVs have four-wheel drive, but some have 2-wheel drive. Nearly all use high-traction tires with tractor-type or comparable treads. Although ATVs are used widely for recreation, they are also very useful in various types of outdoor work and business, such as surveying terrain, monitoring and maintaining pipelines and utility lines, caring for livestock, etc.

It is often necessary to transport an ATV to and from suitable recreational or job sites. To accomplish this type of transport, an ATV is usually loaded into the bed of a pickup truck or towable trailer.

It is not uncommon for ATVs to be equipped with a windshield. During transport, wind pressure on the windshield is much greater than the pressure the windshield is designed to experience during normal ATV use. This wind pressure can lead to micro-cracks that can cause premature failure of the windshield and thus shorten its useful life.

Accordingly, there is a need to address this problem.

SUMMARY OF THE INVENTION

Therefore, one aspect of the present invention is to provide a windshield apparatus that can overcome the problems of the prior art.

It is another aspect of the invention to provide improved elements and arrangements of a windshield assembly for the purposes described which is inexpensive, dependable, and fully effective in accomplishing its intended purposes.

In one preferred embodiment, a windshield assembly includes a windshield panel being movable between an operable position and an inoperative position, and a coupling assembly coupled to the windshield panel, the coupling assembly including at least one coupling member that enables the windshield panel to move between the operative position and the inoperative position.

In another preferred embodiment, the coupling assembly may include a first end defining a mounting bracket and a second end defining a pivot point about which the windshield panel pivots. Further, the coupling assembly may include ratchet washers that allow one-way movement only. The inoperative position may be toward a rear side of said windshield panel, and the inoperative position may be toward a front side of said windshield panel.

Further the windshield assembly may include a handguard element connected to the windshield panel. The coupling assembly may be connected to the windshield panel or the handguard element. The handguard element may be mounted with a central portion and a pair of hand protecting members integrally extending from opposite sides of the central portion.

These and other aspects of the present invention will be described in or readily apparent upon further review of the following specification and drawings.

BRIEF DESCRIPTION OF THE DRAWINGS

Preferred embodiments of the invention will be described in relation to the appended drawings, in which:

FIG. 7A is a plan view of a coupling assembly of a windshield assembly according to an embodiment of the present invention;

FIG. 7B is a side view of the coupling assembly shown in FIG. 7A;

FIG. 8A is a plan view of a mounting structure of a windshield assembly according to an embodiment of the present invention;

FIG. 8B is a side view of the mounting structure shown in FIG. 8A;

Similar reference characters denote corresponding features consistently throughout the attached drawings.

DETAILED DESCRIPTION OF PREFERRED EMBODIMENTS

Figure 1:
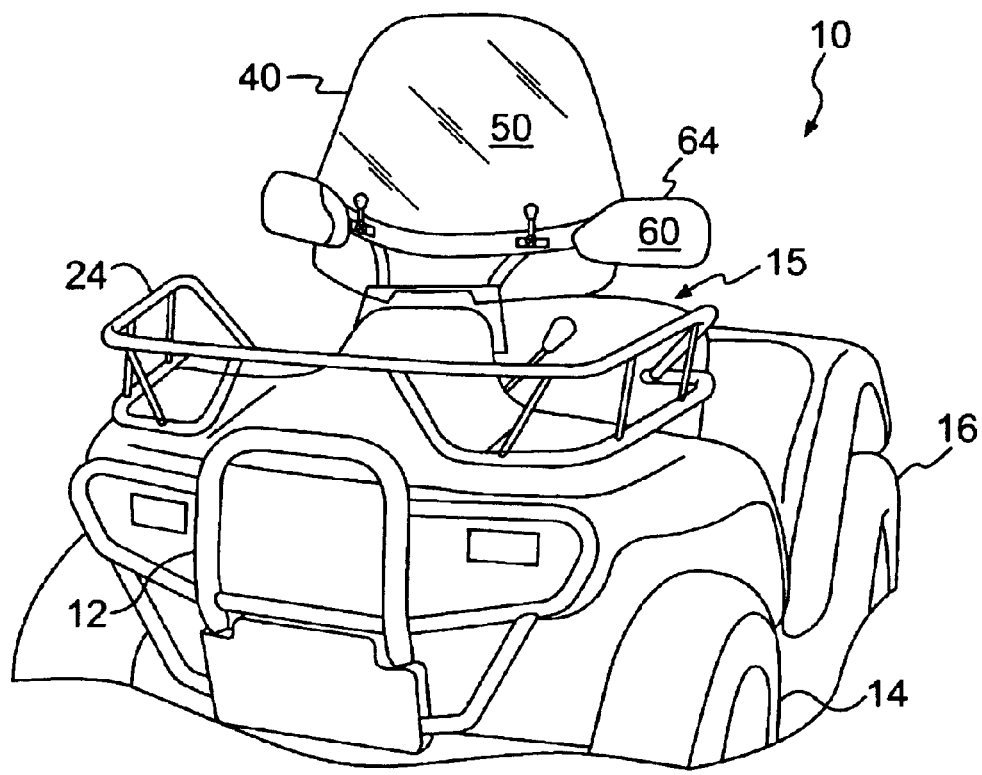
FIG. 1 is a front perspective view of an ATV equipped with a windshield assembly according to an embodiment of the present invention.
Figure 2:
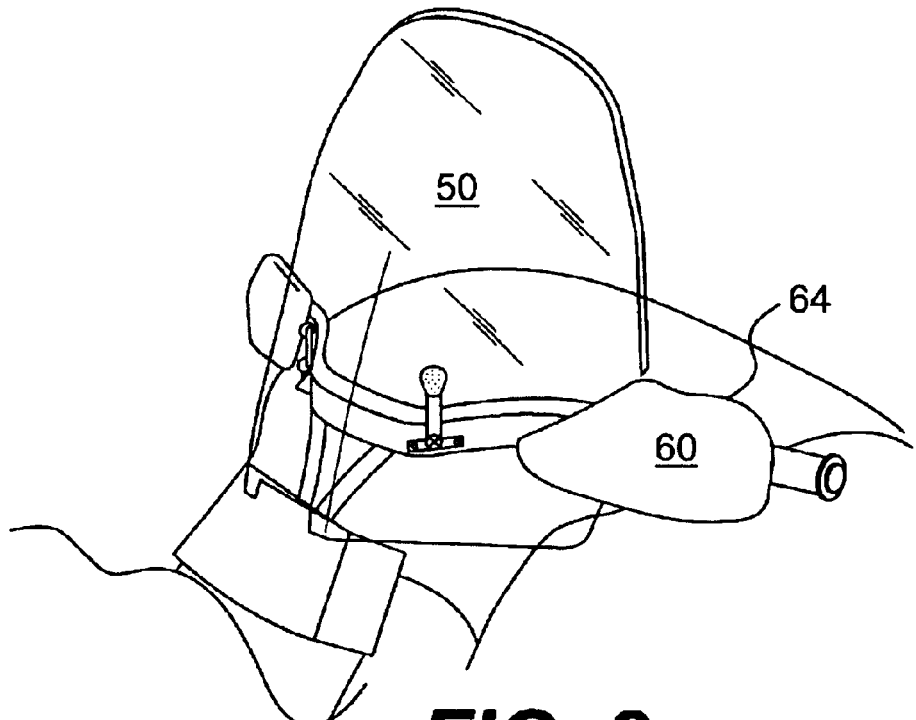
FIG. 2 is a front perspective view of the windshield assembly shown in FIG. 1, wherein the windshield is in a vertical orientation.
Figure 3:
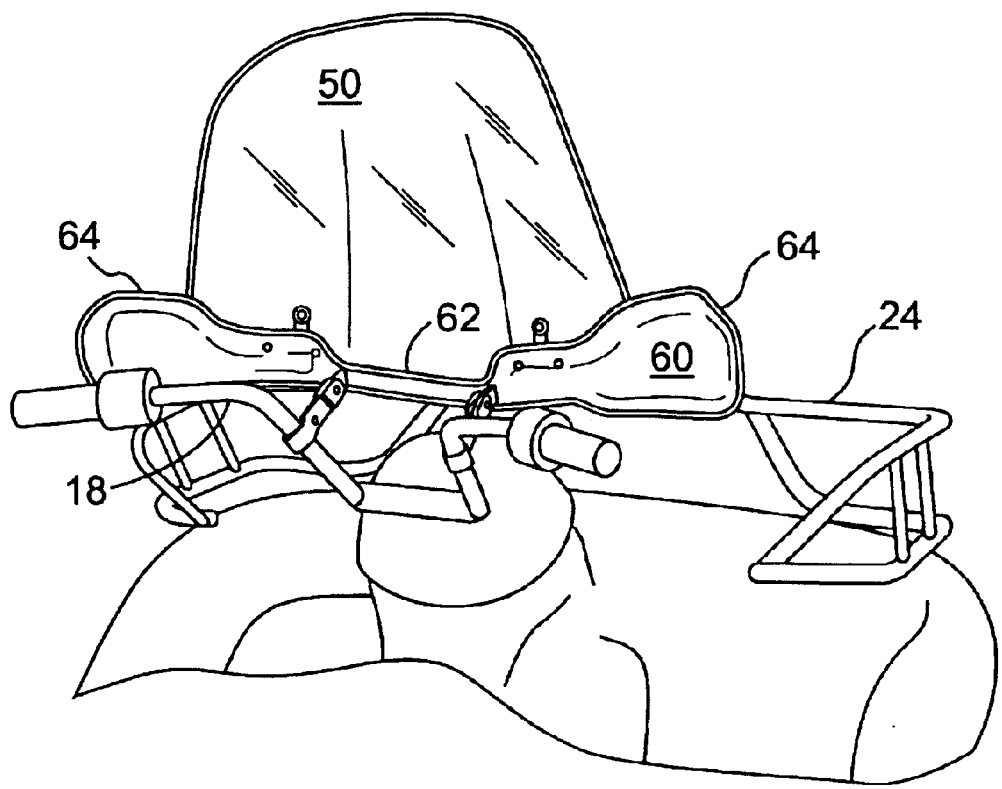
FIG. 3 is a rear perspective view of the windshield assembly shown in FIG. 2, wherein the windshield is in a vertical orientation.
Figure 4:
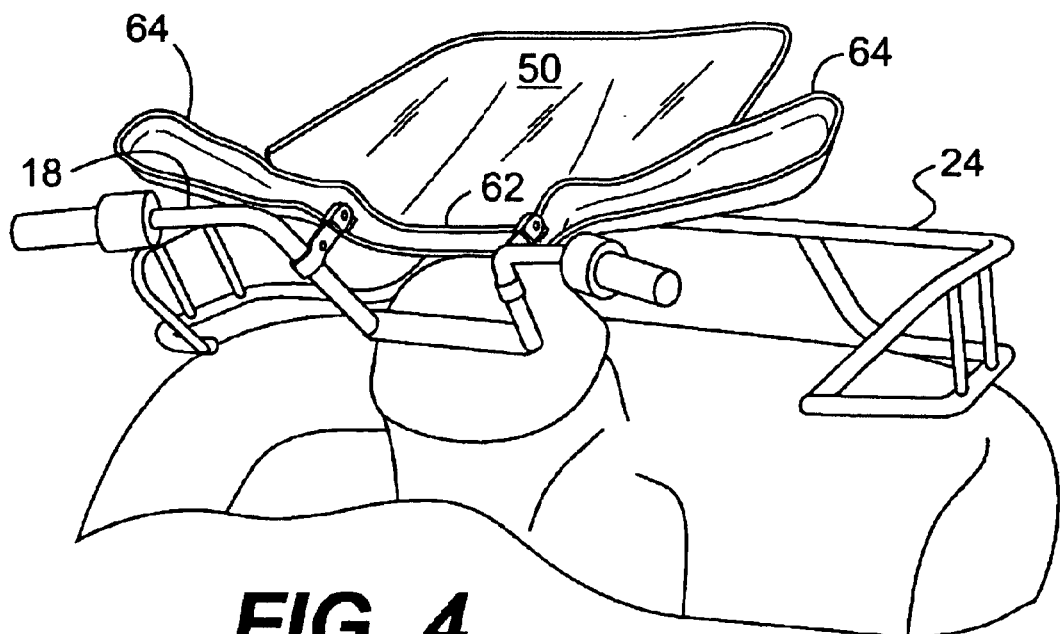
FIG. 4 is a rear perspective view of the windshield assembly shown in FIG. 2, wherein the windshield is in a forwardly oriented, inoperative position.
Figure 5:
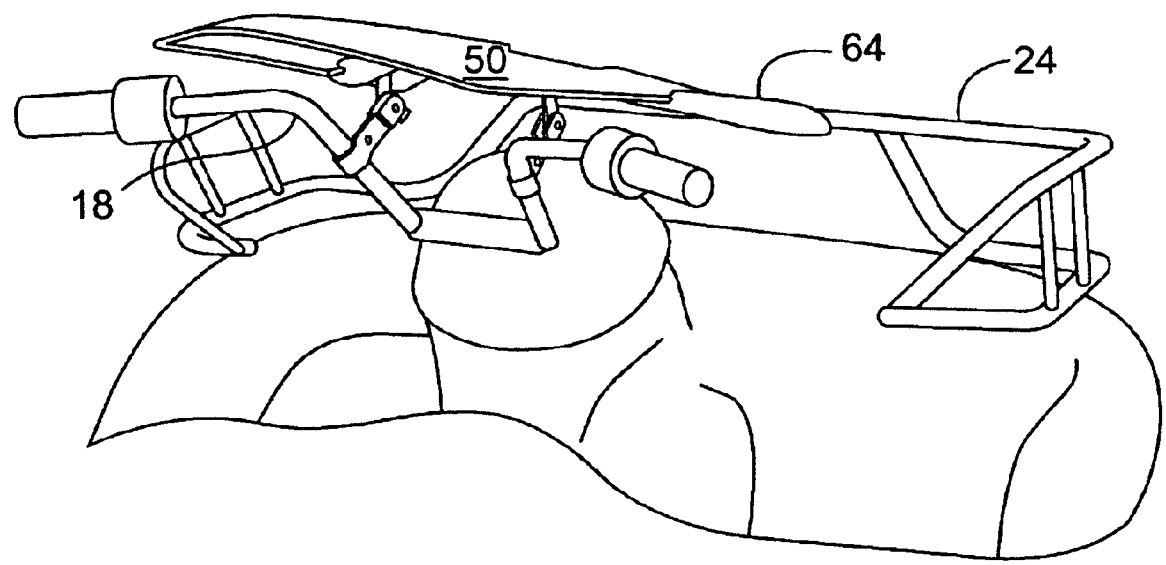
FIG. 5 is a rear perspective view of the windshield assembly shown in FIG. 2, wherein the windshield is in a rearwardly oriented, inoperative position.

Referring now the drawing figures, particularly to FIG. 1, there is illustrated an ATV generally designated 10. ATV 10 is characterized generally by having a chassis to which various systems and components of ATV 10 are attached. (The ATV shown is manufactured by Bombadier Inc. of Montreal, Quebec, Canada, under the trademark "TRAXTER".) The chassis includes a vehicle frame, two front wheels 14, two rear wheels 16, a handlebar 18 (FIG. 3) for steering the front wheels 14, a windshield assembly 40, a straddle-type seat 15 designed for a single rider, laterally extending footrests (not shown) on opposite sides of ATV 10, and an engine and transmission (not shown) located generally beneath the straddle-type seat and substantially between the footrests. The front and rear wheels 14, 16 of ATV 10 each include a tire, e.g., a pneumatic rubber tire suitably mounted on a rim. The seat is preferably made of durable weather resistant material, such as vinyl/foam or other material. A front body cover and a rear body cover are arranged over upper portions of the vehicle frame. The body covers are preferably made of durable material, such as high density polyethylene or other material. The front body cover and rear body cover each include fenders for covering upper portions of the front and rear wheels 14, 16. A front storage rack 24 may be arranged over the front body cover for allowing cargo to be secured thereto. A rearwardly-disposed towing tongue assembly (not shown) may be positioned between the pair of rear wheels 16. Such a towing tongue assembly generally includes an arm with a steel ball end removably couplable with a standard hitch arm. ATV 10 may include a front bumper 12 to protect the vehicle frame as well as the headlights. ATV 10 may also be equipped with a winch apparatus (not shown).

ATV 10 may include a braking system capable of braking all four wheels. Typically such a braking system includes a separate disc brake on each front wheel and a disc brake on the generally rigid axle carrying the rear wheels (though on ATVs having the rear wheels mounted on independent suspensions, separate brake units may be provided for each wheel). A master cylinder, typically operated by a handlebar-mounted lever, is hydraulically connected to each of the disc brake calipers so that actuation of the lever simultaneously actuates one or more brake calipers. The rear brake or brakes may be operated with a foot brake.

ATV 10 may be a two-wheel or a four-wheel drive unit with all four wheels 14, 16 powered with operation of the motor powering the vehicle. Power is transmitted to the rear wheels 16 through a suitable differential housed within a differential housing connecting the differential gearing to the rear wheels 16. Conventional transmission gearing (not shown) connects the ATV motor to the front wheels 14.

Figure 11:
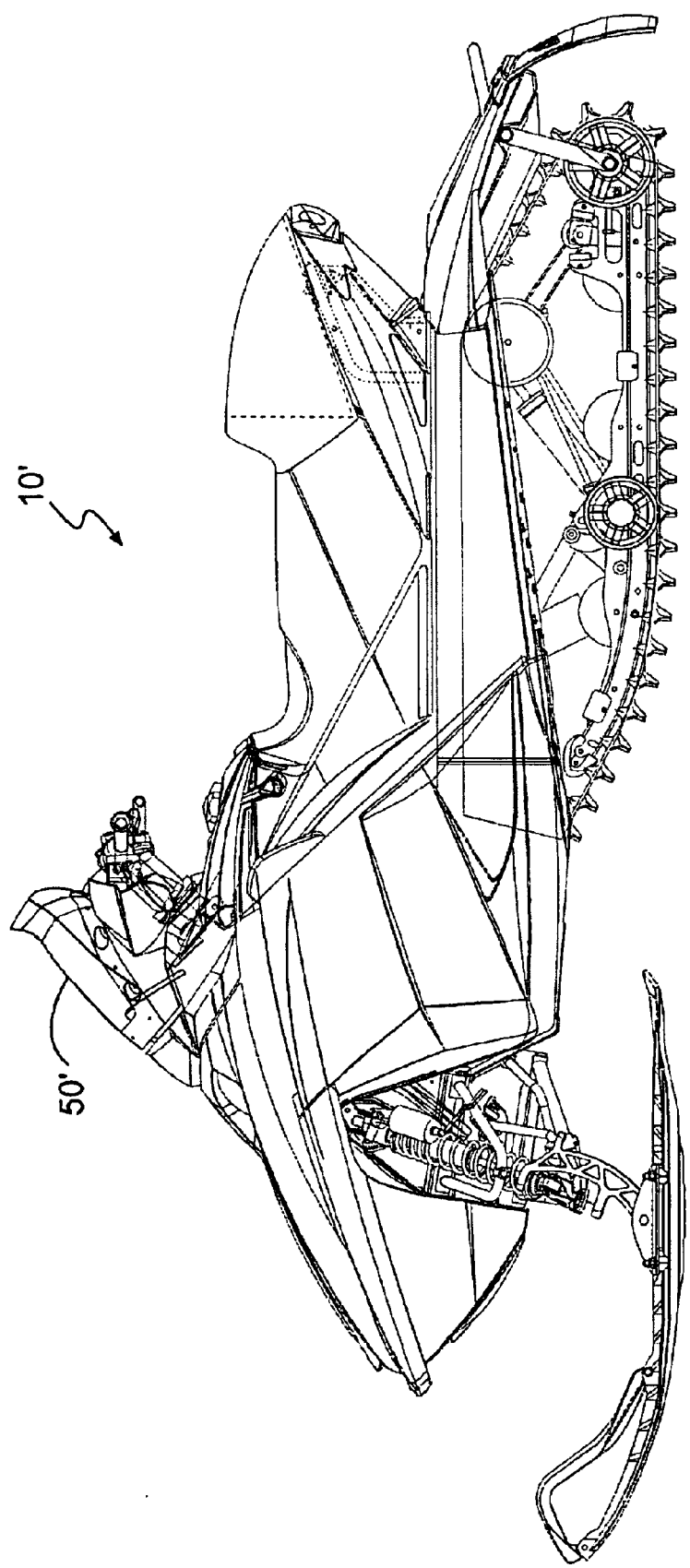
FIG. 11 is a lateral view of a snowmobile equipped with a windshield assembly according to an embodiment of the present invention.

It should be appreciated that the foregoing features of the vehicle 10, such as the positioning and type of body cover, the use of storage rack, etc., could be readily varied. This description of the vehicle is merely given to provide an environment in which the windshield assembly can be used and is not intended to limit the instant invention. Moreover, it should be recognized that the instant invention can be applied not only in ATVs, but also in other vehicles, such as motorcycles, snowmobiles, three-wheeled vehicles, etc. For example, see the windshield 50 illustrated on the snowmobile 10 in FIG. 11.

The windshield assembly 40 comprises a windshield panel 50 and a coupling or pivot assembly 70 (FIGS. 7A and 7B). The coupling assembly enables windshield panel 50 to move between an operative position and an inoperative position. The inoperative position may be when the windshield panel is moved forwardly or rearwardly, e.g., approximately 90°.

A handguard element 60 may be connected to or integrally formed on windshield panel 50. Windshield assembly 40 is configured to be coupled to handlebar 18, either directly or through handguard element 60. Grips are attached to the right and the left end part of handlebar 18. For example, the right grip may serve as a throttle grip, i.e., to control the operating speed of the engine.

Windshield panel 50 is preferably configured from transparent and strong material, such as polycarbonate plastic or the like (although other materials may be used). However, the windshield panel 50 can be made from an opaque material so long as the driver's vision is not impaired. Alternatively, the windshield panel may include an opaque portion positioned very close to the handguard element 60 and a transparent portion above the opaque portion.

FIGS. 2–5 illustrate windshield panel 50 mounted to handguard element 60. Windshield panel 50 is mounted to the handguard element 60 via a mounting structure, e.g., two sets of mounting structures. As shown in FIGS. 8A and 8B the mounting structures preferably comprise, e.g., a T-shaped element 52, which can be made of metal. T-shaped element 52 is positioned on the inside of windshield 50. T-shaped element 52 has a vertical section 54 and a horizontal section 56. Vertical section 54 is configured for fastening to windshield panel 50. Vertical section 54 includes two fastening holes defined therein that enable the fasteners 55 such as bolts or the like to pass therethrough. Windshield panel 50 is attached to vertical section 54 of T-shaped element 52 via fasteners 55 which pass through holes defined in the windshield panel 50 and the fastening holes defined in the vertical section 54. Horizontal section 56 of the T-shaped element 52 includes, e.g., two fastening holes defined therein which enable fasteners 57, such as bolts or the like, to pass therethrough. Handguard element 60 is attached to horizontal section 56 of T-shaped element 52 via fasteners 57 which pass through the holes defined in handguard element 60 and the fastening holes defined in horizontal section 56. As noted above, there is a mounting structure on one lateral side of windshield panel 50 and a mounting structure on the opposite lateral side of windshield panel 50.

Handguard element 60 may include a central portion 62 and a pair of hand protecting members 64 integrally extending from opposite sides of central portion 62. Handguard element 60 may be constructed from any rigid material, such as plastic or the like. Central portion 62 of the handguard element 60 may be fastened to coupling assembly 70. Coupling assembly 70 may also be connected to handlebar 18. Alternatively, handguard element 60 may be connected directly to handlebar 18, in which case handguard element 60 may not be moveable with respect to handlebar 18. Moreover, handguard element 60 need not include central portion 62 or be attached to windshield panel 50.

Coupling assembly 70 may be configured for positioning handguard element 60 in wind blocking relation to the grips attached to the right and left end parts of handlebar 18 when windshield assembly 40 is in an operative position, e.g., in a vertical orientation. Coupling assembly 70 may also orient handguard element 60 in a horizontal or inoperative position, either rearwardly or forwardly (see FIGS. 4 and 5). The pair of hand protecting members 64 may also protect a driver's hands from harmful debris while driving the ATV. Alternatively, or in addition, each hand protecting member 64 may deflect air past the rider's hands.

Figure 6:
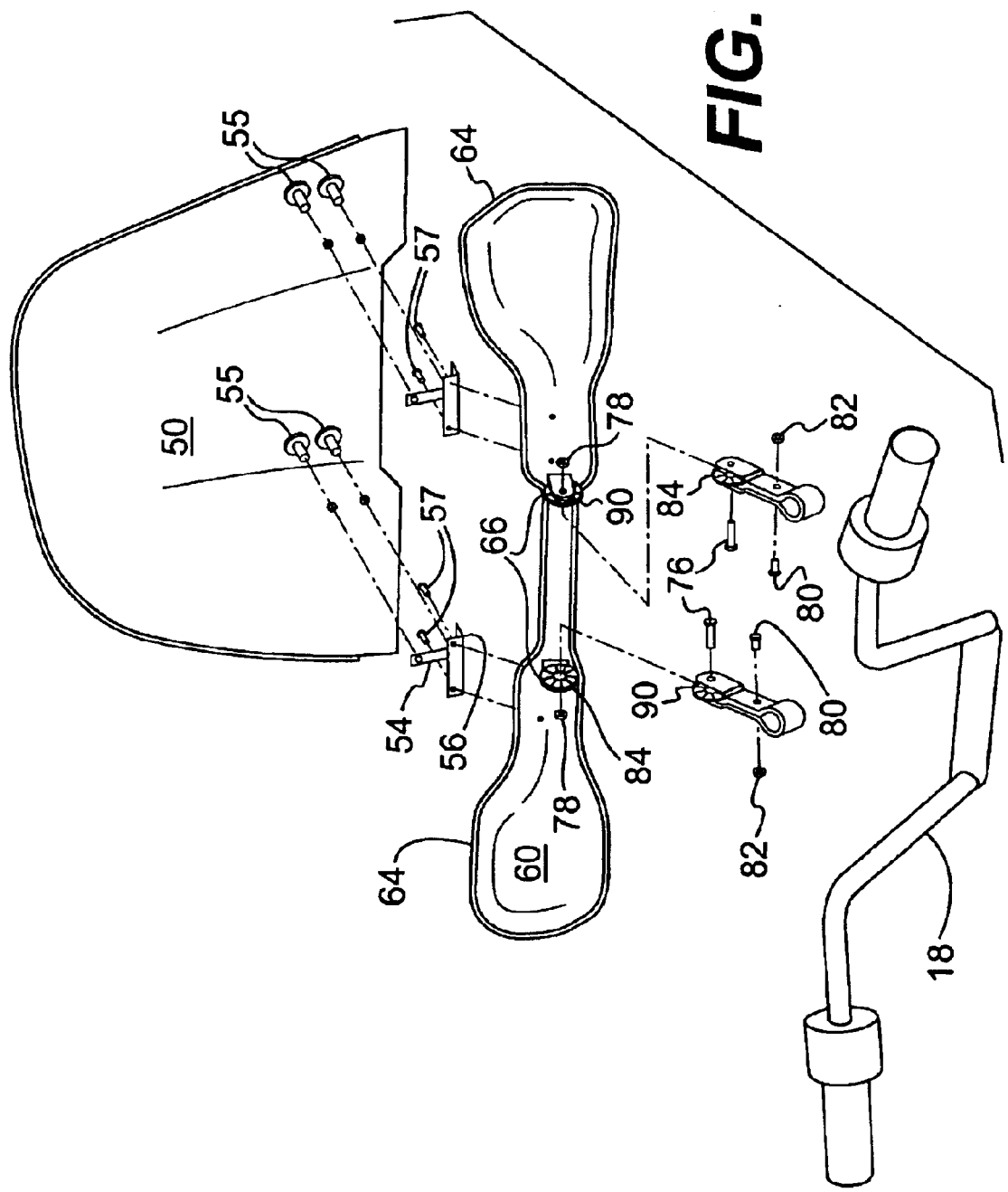
FIG. 6 is an exploded view of the windshield assembly shown in FIG. 2.

Each coupling assembly 70 of the windshield assembly 40 may include a first end 72 defining a mounting bracket and a second end 74 defining a pivot point about which windshield panel 50 pivots. Bracket 72 may be, e.g., a U-shaped bracket (FIGS. 6, 7A, and 7B) that is secured around handlebar 18 on each side of the steering column. U-shaped bracket 72 may be made out of any of a number of durable materials, such as metal or the like. Handguard element 60 may include extensions 66 that are coupled to the second end 74 of coupling assembly 70.

Coupling assembly 70 may include fastening holes configured for passing fasteners 76, 80 (such as bolts terminated with nuts 78, 82 or the like) therethrough so as to securely fasten the first end 72 to handlebar 18 and the second end 74 to extension 66.

Figure 9A:
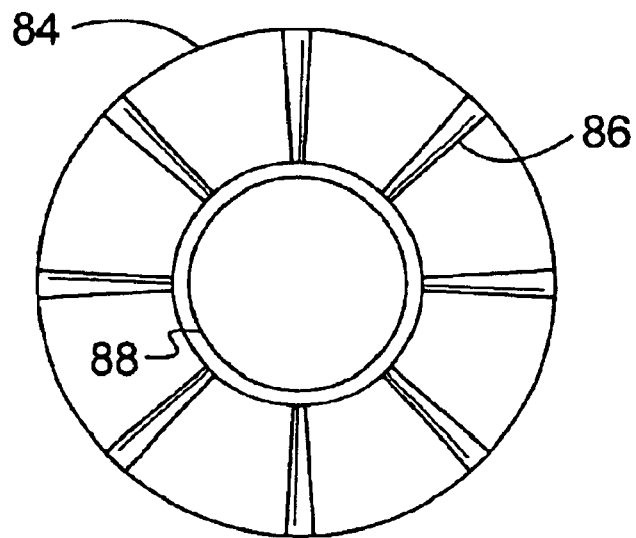
FIG. 9A is a plan view of a ratchet washer for a coupling assembly of a windshield assembly according to an embodiment of the present invention.
Figure 9B:
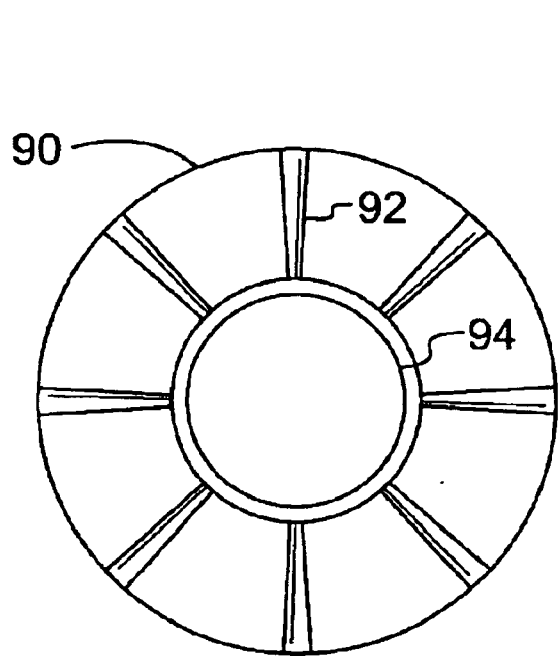
FIG. 9B is a plan view of a ratchet washer for a coupling assembly of a windshield assembly according to an embodiment of the present invention.
Figure 10:
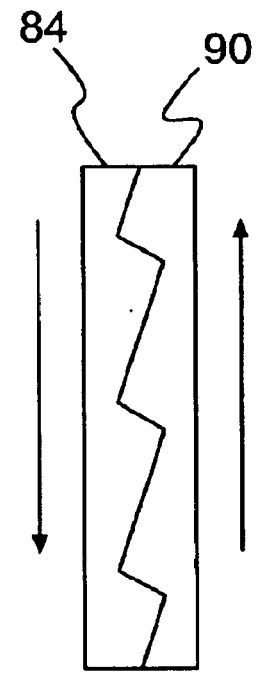
FIG. 10 is a side view of the ratchet washer pair shown in FIGS. 9A and 9B.

Coupling assembly 70 is configured to permit relative movement of the windshield assembly in any direction either towards or away from the seat, e.g., through a range of approximately 180° from one side to another side and may be fixed at any angle therebetween. Coupling assembly 70 may enable fixing of windshield panel 50 at any desired angle. Either end of such movement is considered to be an inoperative position (i.e., in the fully tilted forward or rearward positions). Coupling assembly 70 may include, e.g., ratchet washers 84, 90 as is shown in FIGS. 9A, 9B, and 10. However, any coupling assembly 70 permitting relative movement or rotation of the windshield assembly with respect to the coupling structure may also be employed.

Ratchet washers 84, 90 include a pair of intermeshing discs 88, 94 having cooperating teeth 86, 92 on their engaging faces. In this example, one of the disks is affixed to the extension 66 of the handguard assembly 60, and another of the disks is fixedly attached to a portion of the second end 74 of the coupling assembly 70. With this arrangement teeth 86, 92 can rotate with respect to one another upon application of a predetermined force. For example, the predetermined force may be the result of the force of wind when ATV 10 is being transported on a trailer.

However, ratchet washers are only one example of a coupling structure useable for the present invention. Other coupling structures also may be employed. For example, bolts 76 may be replaced with a quick release bolt that is similar to those for releasing bicycle wheels. This embodiment is not shown. With the quick release bolt, the windshield panel 50 can be moved backward or forward and locked in the desired position. Moreover, bolt 76 can be keyed to the extension 66 such that, upon exceeding a predetermined (rotational) force from extension 66, a keying element and/or bolt 76 is caused to break, which enables movement of windshield panel 50. Thus, when replacing windshield panel, only bolt 76 and/or keying element would need to be replaced. Stated differently, keying element and/or bolt 76 can act as a mechanical fuse.

It is to be understood that the present invention is not limited to the preferred embodiments, which are illustrative. Various modifications will occur to those of ordinary skill in the art which are within the scope of the present invention. For example, while the coupling assembly may allow pivoting movement, bending or other forms of non-pivotable movement are also within the scope of the present invention.

What is claimed is:

1. A windshield assembly, comprising:
   a windshield panel movable between an operative position and two inoperative positions, wherein the operative position lies between the two inoperative positions; and
   a coupling assembly coupled to the windshield panel, the coupling assembly including at least one coupling member that enables the windshield panel to move between the operative position and the inoperative positions,
   wherein the inoperative positions include both a forward position in which the windshield panel is displaced from the operative position in a direction facing a windward side of the windshield panel and a rearward position in which the windshield panel is displaced from the operative position in a direction facing away from the windward side of the windshield panel.

2. The windshield assembly according to claim 1, wherein the coupling assembly includes a first end defining a mounting bracket and a second end defining a pivot point about which the windshield panel pivots.

3. The windshield assembly according to claim 2, wherein the second end includes ratchet washers that allow one-way movement only.

4. The windshield assembly according to claim 1, wherein the windshield panel comprises polycarbonate plastic.

5. The windshield assembly according to claim 1, further comprising a handguard element connected to the windshield panel.

6. The windshield assembly according to claim 5, wherein the handguard element includes a central portion and a pair of hand protecting members integrally extending from opposite sides of the central portion.

7. The windshield assembly according to claim 5, wherein the handguard element comprises plastic.

8. The windshield assembly according to claim 5, further comprising at least one bracket assembly that mounts to the windshield panel.

9. The windshield assembly according to claim 8, wherein the at least one bracket assembly comprises a T-shaped element having a vertical section and a horizontal section, the vertical section includes at least one fastening hole defined therein that enables at least one fastener to pass therethrough, and the horizontal section includes at least one fastening hole defined therein that enable at least one fastener to pass therethrough.

10. The windshield assembly according to claim 9, wherein the windshield panel is attached to the vertical section of the T-shaped element via at least one fastener that passes through at least one hole defined in the windshield panel and the fastening hole defined in the vertical section.

11. The windshield assembly according to claim 9, wherein the handguard element is attached to the horizontal section of the T-shaped element via at least one fastener that passes through at least one hole defined in the handguard element and the fastening hole defined in the horizontal section.

12. The windshield assembly according to claim 9, wherein at least a portion of the windshield panel is transparent.

13. A vehicle, comprising:
   a frame;
   at least one ground contacting element suspended from the frame to provide an interface between the frame and ground;
   a handlebar operatively connected to the ground contacting element to steer the vehicle;
   a seat positioned on the frame; and
   a windshield assembly mounted on the frame, wherein the windshield assembly comprises a windshield panel movable between an operative position and two inoperative positions, wherein the operative position lies between the two inoperative positions, and a coupling assembly between the handlebar and the windshield panel, the coupling assembly including at least one coupling member that enables the windshield panel to move between the operative position and the inoperative positions, wherein the inoperative positions include both a forward position in which the windshield panel is displaced from the operative position in a direction facing away from the seat and a rearward position in which the windshield panel is displaced from the operative position in a direction toward the seat.

14. The vehicle according to claim 13, wherein the coupling assembly includes a first end defining a mounting bracket and a second end defining a pivot point about which the windshield panel pivots.

15. The vehicle according to claim 14, wherein the second end includes ratchet washers that allow one-way movement only.

16. The vehicle according to claim 13, wherein the windshield panel comprises polycarbonate plastic.

17. The vehicle according to claim 13, further comprising a handguard element connected to the windshield panel.

18. The vehicle according to claim 17, wherein the handguard element comprises a central portion and a pair of hand protecting members integrally extending from opposite sides of the central portion.

19. The vehicle according to claim 17, wherein handguard element comprises plastic.

20. The vehicle according to claim 17, further comprising at least one bracket assembly for mounting the windshield panel to the handguard element.

21. The vehicle according to claim 20, wherein the at least one bracket assembly comprises a T-shaped element having a vertical section and a horizontal section, the vertical section of the T-shaped element includes a fastening hole defined therein that enables a fastener to pass therethrough, and the horizontal section includes at least one fastening hole defined therein that enable at least one fastener to pass therethrough.

22. The vehicle according to claim 21, wherein the windshield panel is attached to the vertical section of the T-shaped element via a fastener that passes through a fastening hole defined in the windshield panel and a fastening hole defined in the vertical section.

23. The vehicle according to claim 21, wherein the handguard element is attached to the horizontal section of the T-shaped element via a fastener that passes through the at least one fastening hole defined in the handguard element and the at least one fastening hole defined in the horizontal section.

24. The vehicle according to claim 17, wherein the handguard element is formed integrally with the windshield panel.

25. The vehicle according to claim 13, wherein the ground contacting element comprises a pair of front wheels and a pair of rear wheels suspended from the frame and the vehicle is an all terrain vehicle.

26. The vehicle according to claim 13, wherein the ground contacting element comprises a pair of front skis and a drive belt and the vehicle is a snowmobile.

27. The vehicle according to claim 13, wherein at least a portion of the windshield panel is transparent.

28. An all-terrain vehicle, comprising:

a frame;

a pair of front wheels and a pair of rear wheels suspended from the frame;

an engine operatively coupled to provide motive force to at least one of the pair of front and rear wheels and selectively operable to provide motive force to both the front and rear pairs of wheels;

a handlebar operatively connected to the front pair of wheels to steer the vehicle;

a straddle-type seat positioned on the frame;

a pair of footrests, one on each lateral side of the straddle-type seat; and a windshield assembly mounted on the frame, the windshield assembly comprising a windshield panel movable between an operative position and an inoperative position, and a coupling assembly between the handlebar and the windshield panel, the coupling assembly including at least one coupling member that enables the windshield panel to move between the operative position and the inoperative position, wherein the inoperative position includes a rearward position in which the windshield panel is displaced from the operative position in a direction facing away from a windward side of the windshield panel, wherein the windshield panel is substantially horizontal and adjacent the straddle-type seat such that wind pressure on the windshield panel is substantially reduced during transport of the vehicle.

29. An all-terrain vehicle according to claim 28, wherein a width between the front pair of wheels is greater than a width of the handlebar.

30. A windshield assembly, comprising:

a windshield panel movable between an operative position and an inoperative position; and a coupling assembly coupled to the windshield panel, the coupling assembly including at least one coupling member that enables the windshield panel to move between the operative position and the inoperative position, wherein the inoperative position includes a forward position in which the windshield panel is displaced from the operative position in a direction facing a windward side of the windshield panel and a rearward position in which the windshield panel is displaced from the operative position in a direction facing away from the windward side of the windshield panel, and wherein the coupling assembly includes a first end defining a mounting bracket and a second end defining a pivot point about which the windshield panel pivots, wherein the second end includes ratchet washers that allow one-way movement only.

31. A windshield assembly, comprising:

a windshield panel movable between an operative position and an inoperative position;

a coupling assembly coupled to the windshield panel, the coupling assembly including at least one coupling member that enables the windshield panel to move between the operative position and the inoperative position, wherein the inoperative position includes a forward position in which the windshield panel is displaced from the operative position in a direction facing a windward side of the windshield panel and a rearward position in which the windshield panel is displaced from the operative position in a direction facing away from the windward side of the windshield panel; and a handguard element connected to the windshield panel.

32. The windshield assembly according to claim 31, wherein the handguard element includes a central portion and a pair of hand protecting members integrally extending from opposite sides of the central portion.

33. A vehicle, comprising:

a frame;

a plurality of wheels suspended from the frame;

a handlebar operatively connected to the wheels to steer the vehicle;

a seat positioned on the frame; and a windshield assembly mounted on the frame, the windshield assembly comprising a windshield panel movable between an operative position and an inoperative position, and a coupling assembly between the handlebar and the windshield panel, the coupling assembly including at least one coupling member that enables the windshield panel to move between the operative position and the inoperative position, wherein the inoperative position includes a forward position in which the windshield panel is displaced from the operative position in a direction facing away from the seat and a rearward position in which the windshield panel is displaced from the operative position in a direction toward the seat, wherein the coupling assembly includes a first end defining a mounting bracket and a second end defining a pivot point about which the windshield panel pivots and the second end includes ratchet washers that allow one-way movement only.

34. A vehicle, comprising:

a frame;

a plurality of wheels suspended from the frame;

a handlebar operatively connected to the wheels to steer the vehicle;

a seat positioned on the frame;

a windshield assembly mounted on the frame, the windshield assembly comprising a windshield panel movable between an operative position and an inoperative position, and a coupling assembly between the handlebar and the windshield panel, the coupling assembly including at least one coupling member that enables the windshield panel to move between the operative position and the inoperative position, wherein the inoperative position includes a forward position in which the windshield panel is displaced from the operative position in a direction facing away from the seat and a rearward position in which the windshield panel is displaced from the operative position in a direction toward the seat; and a handguard element connected to the windshield panel.

35. The vehicle according to claim 34, wherein the handguard element includes a central portion and a pair of hand protecting members integrally extending from opposite sides of the central portion.

* * * * *